(12) United States Patent
Wolff

(10) Patent No.: US 10,443,461 B2
(45) Date of Patent: Oct. 15, 2019

(54) HONEY COMB ASSEMBLY

(71) Applicant: DINEX A/S, Middelfart (DK)

(72) Inventor: Thomas Wolff, Münchberg (DE)

(73) Assignee: DINEX A/S, Middelfart (DK)

( * ) Notice: Subject to any disclaimer, the term of this patent is extended or adjusted under 35 U.S.C. 154(b) by 223 days.

(21) Appl. No.: 14/781,743

(22) PCT Filed: Apr. 2, 2014

(86) PCT No.: PCT/EP2014/056571
§ 371 (c)(1),
(2) Date: Oct. 1, 2015

(87) PCT Pub. No.: WO2014/161873
PCT Pub. Date: Oct. 9, 2014

(65) Prior Publication Data
US 2016/0061076 A1 Mar. 3, 2016

(30) Foreign Application Priority Data

Apr. 3, 2013 (EP) ..................... 13162237

(51) Int. Cl.
| | | |
|---|---|---|
| *F01N 3/022* | (2006.01) | |
| *B01D 46/24* | (2006.01) | |
| *C04B 14/00* | (2006.01) | |
| *C04B 14/30* | (2006.01) | |
| *C04B 16/02* | (2006.01) | |
| *C04B 28/34* | (2006.01) | |
| *C04B 38/00* | (2006.01) | |
| *F01N 3/28* | (2006.01) | |
| *F01N 13/16* | (2010.01) | |
| *C04B 111/00* | (2006.01) | |

(52) U.S. Cl.
CPC ....... *F01N 3/0222* (2013.01); *B01D 46/2418* (2013.01); *C04B 14/005* (2013.01); *C04B 14/303* (2013.01); *C04B 16/02* (2013.01); *C04B 28/34* (2013.01); *C04B 28/348* (2013.01); *C04B 38/0019* (2013.01); *F01N 3/2828* (2013.01); *C04B 2111/00793* (2013.01); *F01N 13/16* (2013.01); *F01N 2330/06* (2013.01)

(58) Field of Classification Search
CPC ...... F01N 3/0222; F01N 3/2828; F01N 13/16; F01N 2330/06; B01D 46/2418; C04B 14/005; C04B 14/303; C04B 16/02; C04B 28/34; C04B 28/348; C04B 38/0019; C04B 2111/00793
See application file for complete search history.

(56) References Cited

U.S. PATENT DOCUMENTS

| | | | | |
|---|---|---|---|---|
| 3,770,401 | A * | 11/1973 | Sheets, Jr. ................ | B24D 3/14 51/308 |
| 3,876,556 | A | 4/1975 | Laack et al. | |
| 4,289,447 | A * | 9/1981 | Sterman ................ | F01D 11/125 264/642 |
| 4,307,198 | A * | 12/1981 | Oda ....................... | C04B 35/478 264/314 |
| 4,483,944 | A * | 11/1984 | Day ........................ | B01J 21/12 428/116 |
| 5,536,686 | A * | 7/1996 | Chung ................... | B22D 19/14 106/690 |
| 7,427,309 | B2 * | 9/2008 | Ohno ................. | B01D 39/2075 264/628 |
| 8,956,436 | B2 * | 2/2015 | Divens-Dutcher ..... | C04B 35/44 422/169 |
| 2005/0037147 | A1 * | 2/2005 | Ogunwumi ............. | B01J 35/04 427/393.6 |
| 2005/0143255 | A1 * | 6/2005 | Morimoto .......... | B01D 39/2093 502/178 |
| 2006/0009347 | A1 * | 1/2006 | Fukuda ................. | C04B 35/465 501/136 |
| 2006/0068159 | A1 * | 3/2006 | Komori .................... | B01J 35/04 428/116 |
| 2006/0228520 | A1 * | 10/2006 | Masukawa ............... | B01J 35/04 428/116 |
| 2007/0092692 | A1 * | 4/2007 | Masukawa ......... | B01D 46/2418 428/116 |
| 2007/0119135 | A1 * | 5/2007 | Miao .................. | B01D 39/2068 55/523 |
| 2007/0169453 | A1 * | 7/2007 | Hayakawa .......... | B01D 46/2459 55/523 |
| 2007/0178275 | A1 * | 8/2007 | Takahashi .......... | B01D 46/2418 428/116 |

(Continued)

FOREIGN PATENT DOCUMENTS

| | | | | |
|---|---|---|---|---|
| DE | 4109916 A1 | 10/1991 | | |
| DE | 102012014225 A1 * | 1/2014 | ......... | C04B 38/0019 |
| EP | 2090559 A1 | 8/2009 | | |

(Continued)

OTHER PUBLICATIONS

Translation of the JP57-22172 abstract Feb. 1982.*

(Continued)

*Primary Examiner* — Amber R Orlando

(74) *Attorney, Agent, or Firm* — Maier & Maier, PLLC

(57) ABSTRACT

The present invention relates to a composition comprising a non-oxide silicon containing component, a water soluble phosphate component, a metal oxide ceramic component, a polysaccharide component and water to 100% w/w. This composition can be transformed into a cement that holds individual honey comb filter segments of a honey comb filter together.

10 Claims, 5 Drawing Sheets

(56) References Cited

U.S. PATENT DOCUMENTS

| | | | | |
|---|---|---|---|---|
| 2008/0236115 A1* | 10/2008 | Sakashita | B01D 46/244 | 55/385.3 |
| 2008/0248238 A1* | 10/2008 | Tomita | B01D 46/0001 | 428/116 |
| 2008/0284067 A1* | 11/2008 | Naruse | C04B 28/24 | 264/630 |
| 2008/0312064 A1* | 12/2008 | His | C04B 35/624 | 501/84 |
| 2009/0041975 A1* | 2/2009 | Kodama | C04B 14/327 | 428/116 |
| 2009/0176043 A1* | 7/2009 | Tomita | C04B 35/565 | 428/34.4 |
| 2010/0247851 A1* | 9/2010 | Miyata | B01J 35/04 | 428/116 |
| 2014/0342898 A1* | 11/2014 | Backhaus-Ricoult | C04B 35/10 | 501/80 |

FOREIGN PATENT DOCUMENTS

| | | |
|---|---|---|
| EP | 2123617 A1 | 11/2009 |
| FR | 2902424 A1 | 12/2007 |
| JP | S5472788 A | 6/1979 |
| JP | 022172 * | 2/1982 |

OTHER PUBLICATIONS

English Translation of DE-102012014225-A1 (Year: 2014).*
International Search Report dated May 28, 2014 from corresponding PCT/EP2014/056571; 3pgs.

* cited by examiner

Assembling layer example 1 after 1050°C

Assembling layer example 2 after 1050°C

Assembling layer comparative example 4 after 1050°C though the whole filter. Cracks throughout the whole filter, so called ring—off cracks can be avoided. Due to this functionality the usage of ceramic fibers is proven successful.

HONEY COMB ASSEMBLY

FIELD OF THE INVENTION

The present invention relates to a composition comprising, such as consisting of, a non-oxide inorganic silicon containing component, a water soluble phosphate component, a metal oxide ceramic component, a polysaccharide component and water; a cement based on this composition; a porous ceramic honey comb filter composed of honey comb filter segments assembled by the cement; a method of making the composition; and a method of making the cement.

BACKGROUND OF THE INVENTION

Fiber based cements consisting of ceramic fibers, a ceramic filler and a silica sol as the binder are well known in the field of refractory materials and the related industries like furnace manufacturing for many years/decades. In the field of Diesel exhaust after treatment systems the material silicon carbide has been established since many years as the most robust material for making Diesel particle filters. It can withstand high temperatures during regeneration, especially during thermo shock regeneration with temperatures in the range of 1100-1200° C. Due to this high temperature stability it has a huge advantage in respect to Cordierite, which is less heat resistant and shows the tendency to melt at temperatures below 1000° C. in presence of ash. In contrast to Cordierite, the coefficient of thermal expansion is with a value of $4.6 \times 10^{-6}$/K high and therefore filters made of silicon carbide have to be built up from single segments, bonded together by an elastic assembling layer. This is especially for these type of filter systems relevant, where the thermal mass or specific weight of the honey comb filter segments are low due to a high porosity level or thin cell walls. To give a rough number: if the specific weight of the porous honey comb filter is less than 750g/l, a filter with the diameter of 5.66" has to be segmented minimum into 4 segments, if a thermo shock test at a soot load of more than 10 g/l should not lead to any damage in form of cracks. For the production of Diesel particle filters by assembling of several honey comb filter segments the Know-How from the fiber based cements used in refractory applications was used and modifications have been developed. The following patents and patent applications describe these type of prior art solutions:

EP 0 816 065 A1 describes an assembly of ceramic honey combs with an elastic material, which contains an organic and an inorganic binder, inorganic particles and inorganic ceramic fibers.

EP 1382445 A2 describes an assembling of ceramic honey combs by a paste like sealing member with subsequent drying and curing. Due to the examples the paste like material is made of a silicon carbide powder, a silica sol and ceramic fibers.

EP 1382442 A2 describes an assembling layer consistent of an inorganic powder or whisker on the basis of silicon carbide or nitrides and a colloidal sol.

EP 1 306 358 A describes an assembling layer consistent of an inorganic powder, inorganic fibers, an inorganic binder and an organic binder, in which the fibers and the particles of the powders are connected which each other three dimensional. EP 1 270 202 A describes an assembling layer which is similar to the other above mentioned solutions.

EP 1 142 619 A describes an assembly of porous ceramic honey comb segments. The main characteristic feature is that the only material for building up the ceramic honey combs, is alpha-silicon carbide. The used material for adhering the segments is again made of silicon carbide powder, ceramic fibers and a silica sol.

EP 1 479 881 A1 describes a filter system, which is build up from many single honey comb filters which are bonded together by an assembly layer, where the coefficient of thermal expansion of the filter segments $\alpha_F$ and that of the assembling layer $\alpha_L$ follows the following equation: $0.01 < |\alpha_L - \alpha_F|/\alpha_F < 1.0$. This shall also be the case for a coating layer for the lateral surface of such an assembled filter. As one can see in the description, in all examples and also in all comparative examples, the assembling layer is build up by a material comprising silicon carbide powders, ceramic fibers and a silica sol. By adding special additives like foaming agents or hollow ash or hollow clay particles, the structure of the assembling layer was changed in that way, that the above given equation for the coefficients of thermal expansion is fulfilled in the temperature range between 300° C. and 900° C.

EP 1 719 881 A1 describes a filter system like the previous EP 1 479 881 A1. In addition it specifies that the specific heat capacity per unit volume of the assembling layer is lower than that of the filter material. EP 1 726 796 A1 describes the corresponding case for the coating of the lateral surface.

To close each second channel on the inlet side of a porous honey comb filter and the corresponding complementary channels on the outlet side all solutions in the state of the art use the same material as for the production of the honey combs. The plugging (closing the open channels) is always done before the final sintering process.

Al solutions for glues and cements for assembling porous honey comb segments due to state of the art describe material compositions, which contain silicon carbide as the inorganic filler, ceramic fibers and a colloidal silica sol as the binder. The inorganic fibers, in most of the solutions alumina silicate fibers, have the function to create a defined tensile strength and to allow crack deflection if necessary. Crack deflection is useful, if due to a high thermal gradient during a soot regeneration phase a crack in one of the filter segments occur. It prevents the crack from moving through the assembling layer into the next segment and subsequently though the whole filter. Cracks throught the whole filter, so called ring—off cracks can be avoided. Due to this functionality the usage of ceramic fibers is proven successful.

A major problem of fiber cements with silica sol is their high shrinkage during the drying and curing/hardening. If during the assembling process of the filter, segments are assembled in more than one layer in one step, the subsequent shrinkage can cause voids and cracks in the cement layer during the drying. If high temperatures of 1000° C. or more are generated in the filter during an active regeneration, additional sintering effects occur in silica sol based cements which increase the formation of cracks. These voids and cracks can reduce the functionality of the filter and could lead in the application later on to a complete push out of single filter segments (telescoping effect). It is therefore important to find a cement, which shows no or no significant shrinkage during the drying and hardening process and which does not show any sintering effect at elevated temperatures.

SUMMARY OF THE INVENTION

The present invention provides a composition and a cement made form this composition that can create an assembling layer, which eliminates all disadvantages of the solutions of the state of the art, a selection of which are briefly described above. In particular the cement of the present invention has a high thermal conductivity equal or higher than that of the filter material of the ceramic honey comb filters, a high specific heat capacity per unit volume equal or higher than that of the ceramic honey comb filters, a coefficient of thermal expansion which is similar to that of the ceramic honey comb filters based on the new type of cement of the present invention, which avoids the use of any type of silica sol.

The present inventors have realized that a new type of cement obtainable by drying a composition comprising a non-oxide inorganic silicon containing component, a water soluble phosphate component, a metal oxide ceramic component, an organic component and water to 100% w/w, and subsequently hardening at a temperature sufficiently high to transform substantially all phosphate components into metaphosphates solves many of the problems of the prior art assempling layers of segments of honey comb filters, and provides the advantages as described above.

Accordingly, in a broad aspect the present invention relates to a composition comprising a non-oxide inorganic silicon containing component, a water soluble phosphate component, a metal oxide ceramic component, a polysaccharide component and water to 100% w/w.

In a further aspect the present invention relates to a composition consisting of a non-oxide inorganic silicon containing component, a water soluble phosphate component, a metal oxide ceramic component, a polysaccharide component and water to 100% w/w.

In another aspect the present invention relates to a cement obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a further aspect the present invention relates to a cement for use as an assempling layer for assempling at least two porous ceramic honey comb filter segments into a porous ceramic honey comb filter, wherein the cement is obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a still further aspect the present invention relates to a cement for use in plugging open ends of channels of a porous ceramic honey comb filter segment and/or a porous ceramic honey comb filter to form a wall flow filter, wherein the cement is obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a further aspect the present invention relates to a cement for use on a lateral outer surface of a porous ceramic honey comb filter, wherein the cement is obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a still further aspect the present invention relates to a cement consisting essentially of a non-oxide inorganic silicon containing component and metaphosphates.

In a further aspect the present invention relates to a porous ceramic honey comb filter comprising at least two honey comb filter segments which segments are assembled by a cement obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a still further aspect the present invention relates to a porous ceramic honey comb filter comprising at least two honey comb filter segments which segments are assembled by a cement obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates for use as a diesel particle filter.

In a further aspect the present invention relates to a system for purifying exhaust gasses selected from an exhaust and emission system comprising a porous ceramic honey comb filter comprising at least two honey comb filter segments which segments are assembled by a cement obtainable by drying a composition comprising a non-oxide inorganic silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

Moreover, the present invention relates to a method of making a composition comprising a non-oxide silicon containing component, a water soluble phosphate component, a metal oxide ceramic component, a polysaccharide component and water comprising mixing the non-oxide silicon containing component, the water soluble phosphate component, the metal oxide ceramic component, the polysaccharide component and ad water to 100% w/w.

Furthermore, the present invention relates to a method of making a cement comprising drying a composition comprising a non-oxide silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates.

In a further aspect the present invention relates to a method of producing a porous ceramic honey comb filter comprising at least two honey comb filter segments which segments are assembled by a cement obtainable by drying a composition comprising a non-oxide silicon containing component, a water soluble phosphate component, a metal oxide ceramic component, a polysaccharide component and water to 100% w/w, at 100° C. and subsequently hardening at a temperature sufficiently high to transform substantially all phosphate components into metaphosphates, the method comprising applying the composition comprising a non-oxide silicon containing component, a water soluble phosphate component, a metal oxide ceramic component, a polysaccharide component and water to 100% w/w to a surface of at least two honey comb filter segments, joining the surfaces and drying the joined honey comb filter segments at 100° C. and subsequently hardening at a temperature sufficiently high to transform substantially all phosphate components into metaphosphates.

FIGURE LEGENDS

DEFINITIONS

Figure 1:
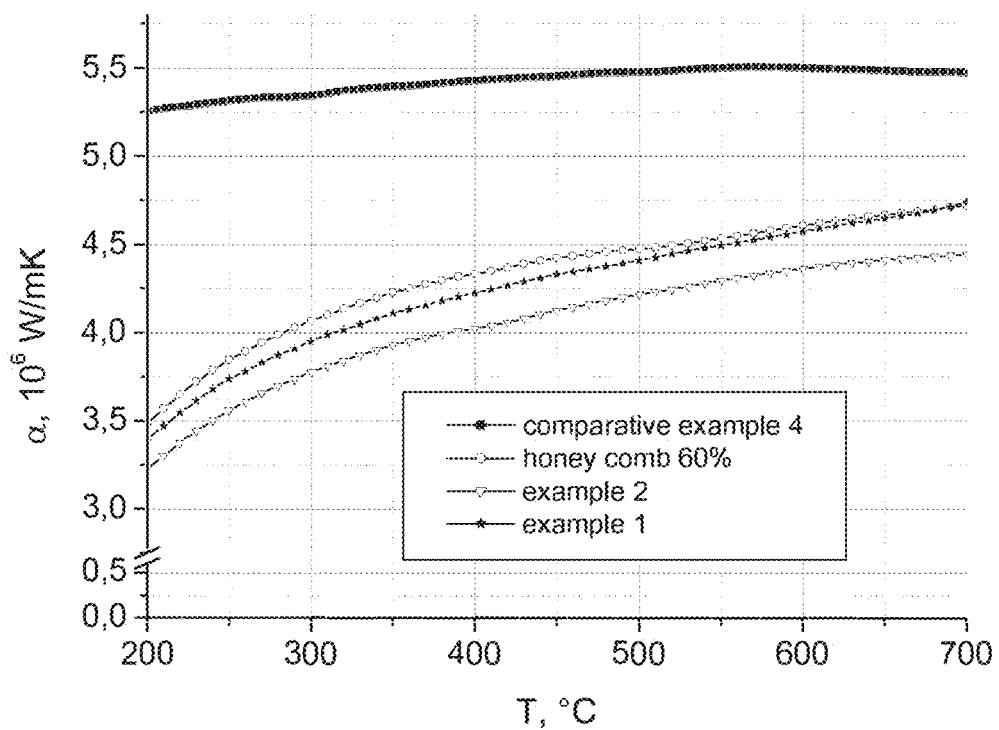
FIG. 1 shows the coefficient of thermal expansion for a honey comb filter segment, a cement according to the present invention and a cement according to the prior art as a function of temperature.

In the present context, the term "a porous honey comb filter" as used herein means a filter for purifying exhaust gasses in which a plurality of porous ceramic honey comb filter segments are combined with one another through adhesive layers. Each of the porous ceramic honey comb filter segments comprises a number of through-holes that typically, are placed in parallel with one another in the length direction with partition wall interposed therebetween and wherein the partition walls functions as a filter for collecting particulates. The porous honey comb filter has its usual meaning as understood by the person skilled in the art, and suitable examples of such filters and how to make such filters are i.a. described in EP0816065, EP1382445, EP1382442, EP1306358, EP1270202, EP1142619, EP1479881, EP1719881, and EP1726796, reference is made in particular to the drawings and description of the drawings.

In the present context, the term "a non-oxide inorganic silicon containing component" as used herein means a component not containing any oxide and containing silicon which builds up the main skeleton of the cement, such as silicon carbide or silicon nitride or mixtures thereof. This component determinates mainly the heat capacity and thermal conductivity of the cement. The reason to choose silicon containing non-oxide ceramic materials as the main component for the composition is their high thermal conductivity and their high specific heat capacity.

In the present context, the term "a water soluble phosphate component" as used herein means a phosphate containing precursor material which is souble in water and able to form itself or in the presence of an oxide ceramic material by a condensation process phosphates and under subsequent heating is able to form metaphosphates, and examples of such components are potassium phosphate, monoaluminium phosphate, acid aluminium phosphate and phosphoric acid or mixtures thereof.

In the present context, the term "a metal oxide ceramic component" as used herein means a metal oxide or mixed metal oxide powder for use as a reaction partner with the water soluble phosphate component to form phosphates and under subsequent heating metaphosphates, and examples of such components are $Na_2O$, $MgO$, $ZnO$, $CaO$, $SiO_2$, $Al_2O_3$ or Mullite ($Al_6Si_2O_{13}$).

In the present context, the term "a polysaccharide component" as used herein means natural polysaccharides such as starch or cellulose as well as modified polysaccharides such as methylated cellulose (cellulose ether). Such a polysaccharide or modified polysaccharide component acts as a temporary binder after drying of the composition for preparing the cement of the present invention. In addition, the polysaccharide component is used to adjust the plasticity of the composition of the present invention. It has furthermore the ability to keep the water in the composition. High porous ceramics have a tendency to absorb a huge amount of water. This leads to the effect that a cement, which is based on a water containing composition, will dry out very fast if it gets in contact with such a high porous ceramic. The water is sucked out of the cement and the cement itself loses its paste like character. To ensure, that the water is kept in the composition of the present invention, the polysaccharide component is used, which is typically a cellulose or cellulose ether. The cellulose or cellulose ether is swelling by absorbing water and keeps the water inside the mixture. At the same time, this swelled cellulose creates a paste like characteristic of the composition, i.e. it can be easily deformed by applying a force and it keeps its shape when no force is applied. This tixotropic behavior is important for the assembling process. The composition needs to flow under pressure when two segments are pressed toward each other and it should stay in between the segments, when the final thickness of the composition layer is reached. This characteristic feature is also called plasticity. The optimal plasticity can be achieved by adding a cellulose or cellulose ether to the composition. The best results in respect to a good plastification can be achieved, if a cellulose ether is added. Cellulose ether can be any type of a methyl cellulose, ethylhydroxyethyl cellulose, hydroxybutylmethyl cellulose, hydroxyethyl cellulose, hydoxymethyl cellulose or hydroxypropyl cellulose or mixtures thereof. After the drying, the cellulose ether acts as a temporary binder and has a significant contribution to the mechanical stability of the cement. Subsequent heating to higher temperatures leads to the formation of the metaphosphates, which are then responsible for the mechanical strength and stability of the cement. At temperatures above 350° C. the cellulose ether decomposes and disappears.

DESCRIPTION OF THE INVENTION

The present invention provides a composition comprising a non-oxide silicon containing component, a water soluble phosphate component, a metal oxide ceramic component, a polysaccharide component and water to 100% w/w. This composition can be used to create a cement with the advantages as explained above.

Preferably the composition consists essentially of a non-oxide silicon containing component, a water soluble phosphate component, a metal oxide ceramic component, a polysaccharide component and water to 100% w/w. In an embodiment composition consists of a non-oxide silicon containing component, a water soluble phosphate component, a metal oxide ceramic component, a polysaccharide component and water to 100% w/w. In one embodiment no silica sol is present in the composition of the present invention.

In a further embodiment of the composition of the present invention the non-oxide silicon containing component is selected from an inorganic powder. The non-oxide silicon containing component is typically selected from silicon carbide or silicon nitride or mixtures thereof. In a particular embodiment the non-oxide silicon containing component is selected from alfa-SiC and beta-SiC or a mixture thereof, preferably alfa-SiC. In another embodiment the non-oxide silicon containing component is selected from $Si_3N_4$. In a further embodiment the non-oxide silicon containing component is selected from a mixture of alfa-SiC and $Si_3N_4$.

In a still further embodiment of the composition of the present invention the non-oxide silicon containing component is selected from an inorganic powder having a bimodal particle size distribution consisting of coarse particles and fine particles. Typically, the inorganic coarse particles have a mean particle diameter size in the range from 20-150 μm and the fine particles have a mean particle diameter size in the range from 1-20 μm. In one embodiment the inorganic coarse particles have a mean particle diameter size in the range from 20-100 μm.

The particle size distributions may be determined using the laser diffraction method as described in the ISO 13320. As used herein the "mean particle diameter size" is intended to means the $D_{50}$ value of the particle size distribution. The $D_{50}$ value specifies the particle diameter, for which 50% of all measured particles are equal or smaller in diameter.

In a further embodiment of the composition of the present invention the water soluble phosphate component is selected from a powder and a liquid solution. In one embodiment the water soluble phosphate component is selected from a powder. In another embodiment the water soluble phosphate component is selected from a liquid solution. Typically, the water soluble phosphate component is selected from mono-aluminium phosphate, acid aluminium phosphate and phosphoric acid or mixtures thereof. In a particular embodiment the water soluble phosphate component is selected from monoaluminium phosphate. In a further embodiment the water soluble phosphate component is selected from acid aluminium phosphate. In a still further embodiment the water soluble phosphate component is selected from phosphoric acid. In a further embodiment the water soluble phosphate component is selected from potassium phosphate.

In a further embodiment of the composition of the present invention the metal oxide ceramic component is selected from an oxide ceramic powder and an oxide ceramic fiber or mixtures thereof. In one embodiment the metal oxide ceramic component comprises $Na_2O$, MgO, ZnO, CaO, $SiO_2$, $Al_2O_3$ or Mullite ($Al_6Si_2O_{13}$). In another embodiment the metal oxide ceramic component comprises α—$Al_2O_3$. In a further embodiment the metal oxide ceramic component comprises mullite. In a further embodiment the metal oxide ceramic component comprises $Na_2O$. In a further embodiment the metal oxide ceramic component comprises MgO. In a further embodiment the metal oxide ceramic component comprises ZnO. In a further embodiment the metal oxide ceramic component comprises CaO. In a further embodiment the metal oxide ceramic component comprises $SiO_2$.

In a still further embodiment of the composition of the present invention the polysaccharide component is selected from a polyvinyl alcohol and a cellulose ether, preferably a cellulose ether. In one embodiment the polysaccharide component is selected from cellulose. In another embodiment the polysaccharide component is selected from methyl cellulose, ethylhydroxyethyl cellulose, hydroxybutylmethyl cellulose, hydroxyethyl cellulose, hydoxymethyl cellulose and hydroxypropyl cellulose or mixtures thereof.

Typically, the composition of the present invention contains a high amount of the non-oxide silicon containing component to ensure a high thermal conductivity. In one embodiment the non-oxide silicon containing component is present in an amount of 30 to 90% w/w, typically at least 50% w/w, such as from 50 to 80% w/w, e.g. 50 to 70% w/w.

In a further embodiment of the composition of the present invention the water soluble phosphate component is present in an amount of 1 to 25% w/w, typically at least 2% w/w, such as 2 to 20% w/w, e.g. 2 to 15% w/w.

In a still further embodiment of the composition of the present invention the metal oxide ceramic component is present in an amount of 1 to 30% w/w, typically at least 3% w/w, such as 3 to 25% w/w, e.g. 3 to 20% w/w.

In a further embodiment of the composition of the present invention the polysaccharide component is present in an amount of 0.2 to 1% w/w, typically at least 0.5% w/w, such as 0.5 to 0.8% w/w.

The new type of cement of the present invention is obtainable by drying a composition of the present invention (and as specified in any one of the embodiments described above) at 100° C. and subsequently hardening at a temperature sufficiently high to transform substantially all phosphate components into metaphosphates, preferably the temperature is sufficiently high to transform all phosphate components into metaphosphates.

In a further aspect the cement of the present invention consist of a non-oxide inorganic silicon containing component and metaphosphates.

This cement of the present invention has several purposes and is typically useful for a) plugging open ends of channels of a porous ceramic honey comb filter segment and/or a porous ceramic honey comb filter to form a wall flow filter; b) applying on a lateral outer surface of a porous ceramic honey comb filter; and c) an assempling layer for assempling at least two porous ceramic honey comb filter segments into a porous ceramic honey comb filter.

In a further embodiment of the cement of the present invention the temperature of hardening is at least 200° C., such as from 200° C. to 800° C., such as from 200° C. to 700° C. Typically, invention the temperature of hardening is at least 350° C., such as from 500° C. to 800° C., such as from 500° C. to 700° C.

After drying and hardening a cement consisting essentially of a non-oxide silicon containing component and metaphosphates is obtained. At temperatures of hardening above 350° C., the polysaccharide component has disappeared, and the water soluble phosphate component has reacted with the metal oxide ceramic component to form the metaphosphates.

In particular with a high content of silicon carbide a high thermal conductivity is realized. The thermal conductivity is further optimized by a bimodal mixture of a coarse grain and a fine grain powder, which reduces the porosity of the cement layer. The coarse silicon carbide builds up the main structure and dominates the thermal conductivity by its big grains. The fine grains fill up the space between the large particles and reduce therefore the porosity. The phosphate and the metal oxide ceramic component reaction partner together build up a binder system, which reacts preferably by heating up to a specific temperature and which shows a low shrinkage during drying and subsequent hardening. The inventor found out, that cements based on the composition of the present invention can be used to create assembling layers, for instance Diesel particle filters, which have a higher elasticity than the filter material and which have an excellent adhesive strength to the filter material. The mechanical strength itself is high and even higher than that of the filter. The thermal conductivity and the coefficient of thermal expansion are similar to that of the filter, and the specific heat capacity is slightly higher than that of the filter.

This type of cement does not change his properties under thermal stress. Especially the adhesion to the filter material and its mechanical properties do not change after thermo shock regeneration. For applications with very high thermal gradients in the filter or especially between assembled filter segments, one of the metal oxide ceramic components can be oxide ceramic fibers. In that case the elasticity and crack deflection inside the assembling layer is increased.

The mechanism of phosphate bonding and the corresponding hardening processes are described in detail in the papers of Karpukhin et al in *Refractories and Industrial Ceramics*, Vol. 46, No. 3, 2005 and Vol. 46, No. 5, 2005. There are several possibilities to make a phosphate based binder material. One way is to use mullite type materials together with phosphoric acid to form a monoaluminum-phosphate $$3Al_2O_3.2SiO_2 + 18H_3PO_4 = 6Al(H_2PO_4)_3 + 2SiO_2 + 9H_2O$$

Under heating above 150° C. the monoaluminum phosphate dehydrates to build acid aluminium pyrophosphate. If a metal oxide ceramic component is present, phosphates are build at elevated temperatures. In case of an aluminium oxide, the aluminium ortho phosphate is build at elevated temperatures. One can also use direct a monoaluminium phosphate and combine it with a metal oxide ceramic component.

These reactions under elevated temperatures, starting at 150° C. up to a temperature of about 300° C. can be summarized by the following equations (see again Refractories and Industrial Ceramics, Vol. 46, No. 3, 2005 and Vol. 46, No. 5, 2005):

$$2Al(H_2PO_4)_3 \xrightarrow{\text{elevated temperatures} > 150° C.} Al_2(H_2P_2O_7)_3 + 3H_2O$$

$$Al(H_2PO_4)_3 + Al_2O_3 \xrightarrow{\text{elevated temperatures} > 150° C.} 3AlPO_4 + 3H_2O$$

Under subsequent heating above 300° C. aluminium metaphosphate is produced. This is decribed by Karpukhin et al and also in an information sheet from Zschimmer & Schwarz, which can be downloaded from their website. Dehydration does not only occur in each individual molecule but even between them (intermolecular). This condensation brings about chain- and ringshaped compounds (Zschimmer & Schwarz).

$$nAl_2(H_2P_2O_7)_3 = [Al(PO_3)_3]_n + nH_2O$$

At 500° C. most of the phosphates will be converted into these metaphosphate structures. A fully conversion with an almost complete dehydration can be achieved at temperatures of 800-1000° C.

In EP0032532A1 a monoaluminium phosphate is used in combination with a Magnesium oxide and a filler material, which can be aluminium oxide, mullite or a clay, to form a refractory material.

In US6309994B1 is described a fiber reinforced refractory material, in which a fiber based preform is infiltrated with a mixture of alumina and an aluminium phosphate solution and subsequent heated to a temperature above 200° C.

Examples for the usage of phosphate containing binders are given by Chung in JOURNAL OF MATERIALS SCIENCE 38 (2003) 2785-2791, by Fernando et al in JOURNAL OF MATERIALS SCIENCE 36 (2006) 5079-5085, and by Baranova in Refractories and Industrial Ceramics Vol. 45, No. 6, 2004. Chung describes a binder on the basis of an acid alumina phosphate derived from phosphoric acid and aluminium hydroxide and Fernando describes a filter materials based on oxide ceramic fibers bonded together with this type of binder. Baranova describes the production of refractory bricks on the basis of boron aluminium phosphate and chromium aluminium phosphate in combination with silicon nitride, silicon carbide and aluminium oxide.

The big advantage of using a phosphate based cement in comparison to a silica sol based cement can be shown by a direct comparison of the characteristic features to an example taken from the state of the art. We made this comparison to the EP 1 479 881 A1, which is a relevant solution according to the state of the art. The main differences between the solution according to this invention to the EP 1 479 881 A1 are given by table 1.

TABLE 1

Main differences of the new cement in accordance to this invention in comparison to the state of the art.

|  | EP 1 479 881 A1 | The present invention |
|---|---|---|
| Coefficient of thermal expansion | $\alpha_L \gg \alpha_F$ (preferred) or $\alpha_L \ll \alpha_F$ | $\alpha_L \approx \alpha_F$ |
| Heat conductivity | Low → insulation | Equal to filter |
| Specific heat capacity | $C_{p,L} \ll C_{p,F}$ | $C_{p,L} \geq C_{p,F}$ |
| Young modulus | $E_L \ll E_F$ | $E_L \ll E_F$ |
| Ceramic fibers | Yes | Not necessarily |

One or more of the following characteristic features of the cement of the present invention when in use as an assembling layer for building up an integral assembly of high porous honey comb filter segments are obtained:

For a porosity level of the honey comb filters of 60% and higher the thermal conductivity is equal or higher than that of the porous ceramic honey comb filter material The specific heat capacity is higher or equal than that of the filter material the coefficient of thermal expansion shows a maximum deviation from that of the filter of 10% over the temperature range of 300° C.-900° C.

the porosity is less than 50%, typically less than 40% the Young modulus is lower than that of the filter material

All of these features are realized by a cement obtainable by drying a composition of the present invention at 100° C. and subsequently hardening at a temperature sufficiently high to transform substantially all phosphate components into metaphosphates, wherein the composition contains a bimodal mixture of inorganic particles, preferably silicon carbide or silicon nitride or mixtures thereof, a water soluble phosphate containing component, minimum one component based on a metal oxide ceramic component as the reaction partner of the phosphate, and a temporary organic component which acts as a binder. In particular this cement is obtainable from a wet mixture, comprising the inorganic powders, the phosphate containing component, water and a cellulose as the temporary binder dissolved into water, which is subsequent dried at 100° C. and then hardened at a temperature above 200° C., preferably above 350° C. In table 2, the different components of the wet mixture are listed and their functionalities are described. As described before the metal oxide ceramic powder can be replaced by oxide ceramic fibers. It is also possible, to use a mixture of oxide ceramic fibers and a metal oxide ceramic powder. The water soluble phosphate containing component can be applied by a powder (monoaluminium phosphate) or in form of a solution (acid aluminium phosphate or dissolved monoaluminium phosphate).

TABLE 2 components and their functionality in the cement.

| Component | Content | Description |
|---|---|---|
| non-oxide silicon containing coarse particles | 25-35% | These particles build up the main structure and define the heat conductivity. It is preferred to use silicon carbide or silicon nitride or mixtures thereof. Particles are in the range of 20-100 µm |
| non-oxide silicon containing fine particles | 25-35% | These particles fill up the voids between the large particles so that the porosity can be reduced to a minimum. It is preferred to use silicon carbide or silicon nitride or mixtures thereof. Particles are in the range of 1-20 µm |
| Water soluble phosphate containing component | 2-15% | This phosphate is given in form of a powder (monoaluminium phosphate) or a liquid solution (acid aluminium phosphate or dissolved monoaluminium phosphate). Together with the reaction partner and under temperature it builds a solid metaphosphate, which glues the inorganic particles together and is highly corrosion and temperature resistant. |
| Metal oxide ceramic powder | 3.5-20% | This fine powder is the reaction partner for the phosphate containing component, which reacts above 200° C. to build the solid metaphosphate. It is also possible to use oxide ceramic fibers instead or in combination with the metal oxide ceramic powder. |
| Water | 20-25% | Water is used to control the viscosity of the system |
| polysaccharide component | 0.5-0.8% | The polysaccharide component is used to adjust the plasticity of the wet mixture and is the temporary binder after the drying step. It is preferred to use poly vinyl alcohol or a cellulose, most preferred a cellusoe ether. |

In a further aspect the present invention concerns a porous ceramic honey comb filter comprising at least two honey comb filter segments which segments are assembled by a cement obtainable by drying a composition of the present invention at 100° C. and subsequently hardening at a temperature sufficiently high to transform substantially all phosphate components into metaphosphates.

In a still further aspect the present invention concerns a porous ceramic honey comb filter comprising at least two honey comb filter segments which segments are assembled by a cement consisting essentially of a non-oxide inorganic silicon containing component and metaphosphates and subsequently hardening at a temperature sufficiently high to transform substantially all phosphate components into metaphosphates.

In a further embodiment of the porous ceramic honey comb filter, the filter consists from 4-32 filter segments, such as from 8-16 filter segments, e.g. from 16 filter segments for a round filter with 143 mm diameter as described in the examples.

In a still further embodiment of the porous ceramic honey comb filter, the porosity of the filter is from 20 to 70%, such as 30 to 50%, or 55-65%.

In a further embodiment of the porous ceramic honey comb filter, the filter is made of a material selected from silicon carbide and silicon nitride or mixtures thereof. Typically, the filter is made of silicon carbide, such as alpha-SiC.

In a further aspect the porous ceramic honey comb filter is for use as a diesel particle filter.

The porous honey comb filter of the present invention is in particular suitable for purifying exhaust gases discharged from internal combustion engines, such as diesel engines from buses and trucks, and construction machines. Such honey comb filter may be an integral part of a system for purifying exhaust gasses from internal combustion engines. Thus, in a further aspect the present invention relates to a system for purifying exhaust gasses selected from an exhaust and emission system comprising a porous ceramic honey comb filter, the filter comprising at least two honey comb filter segments which segments are assembled by a cement obtainable by drying a composition of the present invention at 100° C. and subsequently hardening at a temperature sufficiently high to transform substantially all phosphate components into metaphosphates. The above embodiments should be seen as referring to any one of the aspects (such as 'composition', 'cement', 'use of cement', or 'cement for use') described herein as well as any one of the embodiments described herein unless it is specified that an embodiment relates to a certain aspect or aspects of the present invention.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

The terms "a" and "an" and "the" and similar referents as used in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

All methods described herein can be performed in any suitable order unless other-wise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The present invention is further illustrated by the following examples which, however, are not to be construed as limiting the scope of protection. The features disclosed in the foregoing description and in the following examples may, both separately and in any combination thereof, be material for realizing the invention in diverse forms thereof.

EXAMPLES

As described above a number of phosphate containing materials can be used to make a composition and cement according to this invention. The most preferable ones are phosphates, which form the pyrophosphates at temperatures above 150° C. In the following examples, a monoaluminium phosphate is used.

Example 1

A wet mixture of the materials listed in table 3 has been made to make a cement for the assembling of porous ceramic honey comb filters

TABLE 3 components and content for cement of example 1

| component | description | content, weight-% |
|---|---|---|
| SiC coarse grain | SiC F240, ESK SiC | 35% |
| SiC fine grain | SiC F800, ESK SiC | 35% |
| α-Al$_2$O$_3$ | 99.9% alpha aeser | 3.5% |
| Monoaluminumphosphate | Lithopix P15 from Zschimmer & Schwarz | 3.0% |
| Cellulose ether | Zusoplast C 92 from Zschimmer & Schwarz | 0.77% |
| water | | 22.73% |

Using this cement highly porous honey comb filter segments made of silicon carbide have been assembled to form an assembly of 4 by 4 segments. The porosity of the filter segments was 60%, the size was for all 35 mm×35 mm×178 mm. All these different filter segments could be assembled without any problems, i.e. no voids or cracks occurred during drying and hardening. The wet thickness of the assembling layers was adjusted to 2 mm, the thickness varies over the whole assembly from 1.2 up to 2.5 mm. The thickness was measured at one position to monitor the changes during drying and hardening.

The drying was performed at 100° C. for 1 hour and the hardening at 550° C. for 1 hour. To burn out any potential residual carbon the assembly was heated up once to 600° C. for half an hour.

During drying and hardening the measured thickness in the specific point has been:
Wet: 2.08 mm
Dry: 1.78 mm
Hardended: 1.75 mm
Samples have been taken from the cement layer to measure
porosity→result: 9.54%
coefficient of thermal expansion—which is plotted in FIG. 1 and at 700° C. the value is 4.74 $10^{-6}$ K$^{-1}$
thermal conductivity at 400° C. 4 result: 1.93 W/mK
specific heat capacity at 400° C. 4 result: 1.12 J/gK Example 2

A wet mixture of the materials listed in table 4 has been made to make a cement for the assembling of porous ceramic honey comb filters

TABLE 4 components and content for cement of example 2

| component | description | content, weight-% |
|---|---|---|
| SiC coarse grain | F240 | 29.0% |
| SiC fine grain | F800 | 29.0% |
| Alumo silicate fibers | Unifrax FFXZ S24 | 10.31% |
| α-Al$_2$O$_3$ | 99.9% alpha aeser | 3.42% |
| Monoaluminumphosphate | Lithopix P15 | 3.0% |
| Cellulose ether | Zusoplast C 92 | 0.68% |
| Water | | 24.6% |

In the same way as in example 1 an assembly of 4 by 4 segments was built up.

The wet thickness of the assembling layers was adjusted again to 2 mm, the thickness varies over the whole assembly from 1.0 up to 2.0 mm. The thickness was measured at one position to monitor the changes during drying and hardening.

During drying and hardening the measured thickness in the specific point has been:
Wet: 1.28 mm
Dry: 1.15 mm
Hardended: 1.12 mm
Samples have been taken from the cement layer to measure
porosity→result: 23.84%
coefficient of thermal expansion—which is plotted in FIG. 1 and at 700° C. the value is 4.44 $10^{-6}$ K$^{-1}$ Example 3

A wet mixture of the materials listed in table 5 has been made to make a cement for the plugging of porous ceramic honey comb filters

TABLE 5 components and content for cement of example 3

| Component | Description | content, weight-% |
|---|---|---|
| SiC fine grain | F800 | 70% |
| α-Al$_2$O$_3$ | 99.9% alpha aeser | 3.5% |
| Monoaluminumphosphate | Lithopix P15 | 3% |
| Cellulose ether | Zusoplast C 92 | 0.8% |
| Water | | 22.7% |

This cement was used to close the channels of high porous honey comb segments with a cell density of 200 cpsi and 300 cpsi. The channel opening of the 200 cpsi honey combs has been 1.4×1.4 mm and that of the 300cpsi has been 1.1×1.1 mm. In both cases the channels could be closed very well with a penetration of the wet cement into the channel of about 5-8 mm. The drying and hardening procedure was the same as for the assembling layers in example 1 and 2.

Comparative Example 4

The commercial available fiber based cement Isofrax DPF-cement from Unifrax was used to assemble an assembly of 4×4 filter segments in the same way as described in example 1. This assembly was dried also at 100° C. for 1 hour and then subsequently heated up to 750° C. for 1 hour.

The wet thickness of the assembling layers was adjusted again to 2 mm, the thickness varies over the whole assembly from 0.8 up to 1.8 mm. The thickness was measured at one position to monitor the changes during drying and hardening.

During drying and hardening the measured thickness in the specific point has been:
Wet: 1.09 mm
Dry: 0.51 mm
Hardended: 0.49 mm The same samples have been taken from the cement layer to measure the coefficient of thermal expansion—which is plotted in FIG. 1 and the value at 700° C. is $5.56 \cdot 10^{-6}$ $K^{-1}$ As described in the examples 1, 2, and 4 honey comb segments have been assembled to an integrate unit. The segments have been a high porous silicon carbide with 60% porosity. The coefficient of thermal expansion was also measured on these segments and the result is plotted over the temperature range from 200° C. to 700° C. in FIG. 1 together with the results for the cements of examples 1, 2 and 4. The value for the coefficient of thermal expansion for the honey comb segment was at 700° C. $4.72 \cdot 10^{-6}$ $K^{-1}$, its thermal conductivity at 400° C. was 2 W/mK and the specific heat capacity at 400° C. was 1.0 J/gK.

Assembled units from examples 1, 2 and 4 have been taken and heated up to a temperature of 1050° C. with a holding time of 1 hour. The assembling layer was inspected under the microscope after the hardening and after the heating step at 1050° C. The result is summarized in table 6.

TABLE 6 evaluation of the assembling layers if the examples 1, 2, and 4 after drying and heating up to 1050° C.

| | Result after drying | Result after heating up to 1050° C. |
|---|---|---|
| Example 1 | shrinkage of 14% no voids, no cracks, no delamination from honey comb surface | no further change in dimensions no voids, no cracks, no delamination from honey comb surface |
| Example 2 | shrinkage of 10% no voids, no cracks, no delamination from honey comb surface | no further change in dimensions no voids, no cracks, no delamination from honey comb surface |
| Comparative example 4 | shrinkage of 53% voids, cracks | no further change in dimensions but increased number of cracks and the voids became larger |

Table 6 clearly show, that the silica sol based cement shows already problems during drying. The increased sintering behavior at 1050° C. lead to huge voids in the assembling layer. This type of cement will lead to problems in applications, where high temperatures can occur very often, i.e. active regenerated systems with fuel burners or passenger car systems with high soot load levels.

Figure 2:
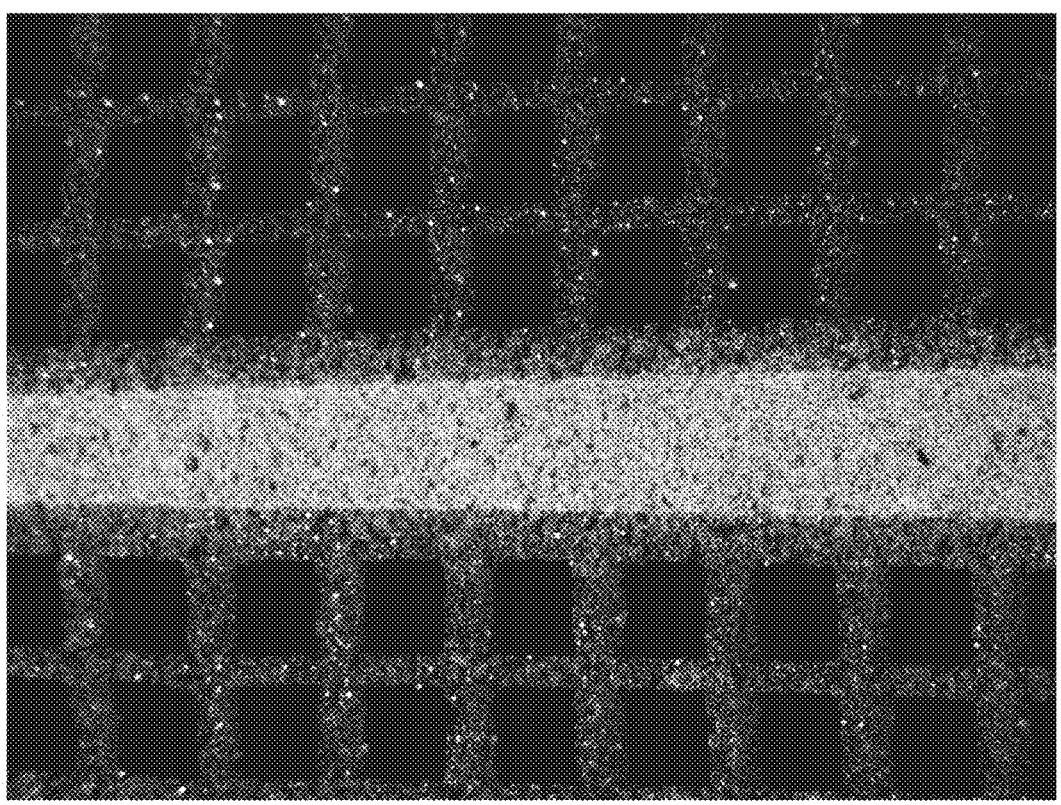
FIG. 2 shows the assembling layer of example 1 after 1050° C.
Figure 3:
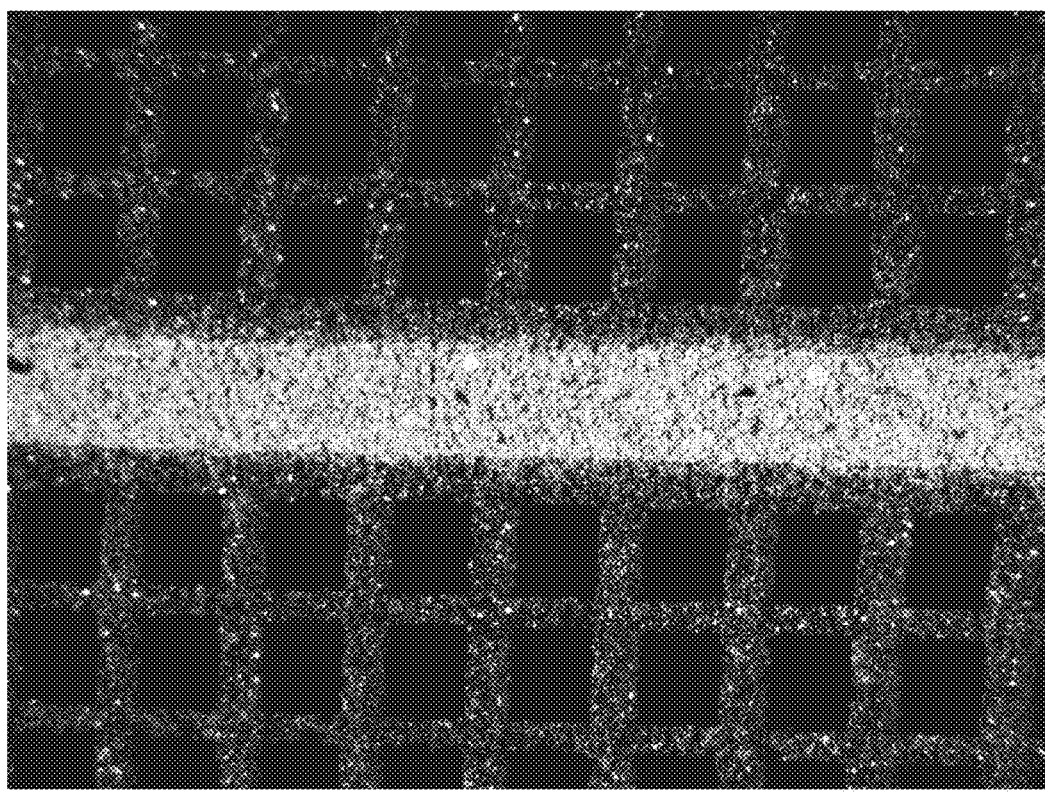
FIG. 3 shows the assembling layer of example 2 after 1050° C.
Figure 4:
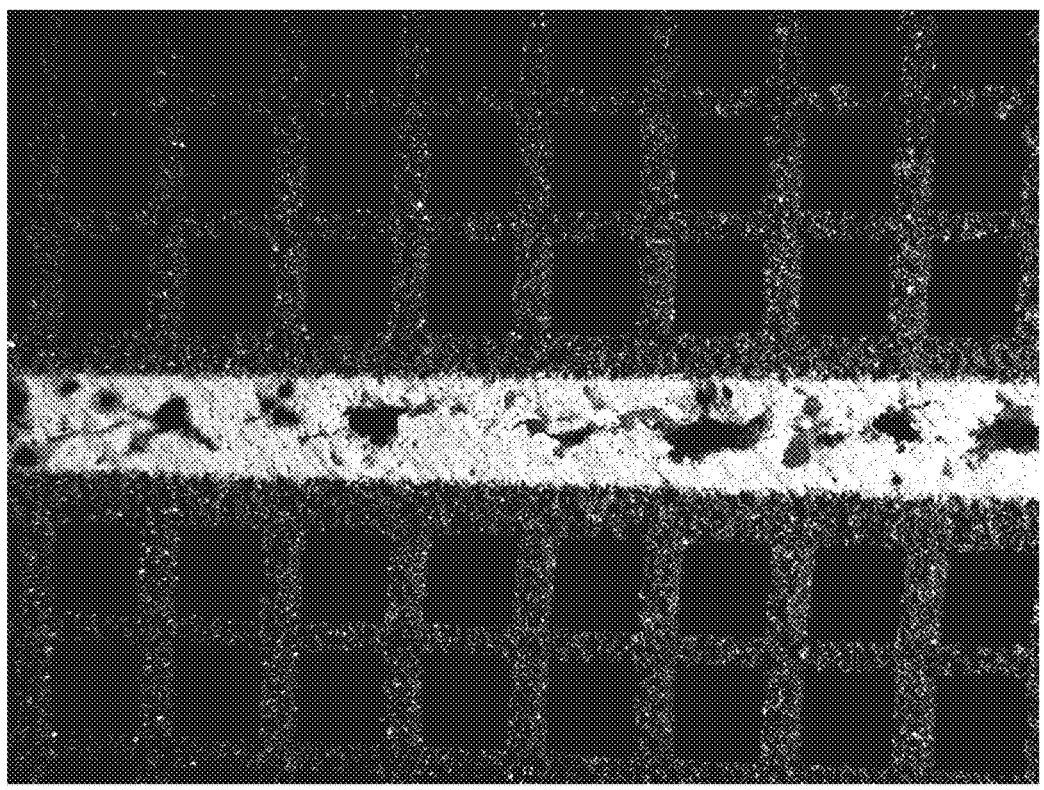
FIG. 4 shows the assembling layer of comparative example 4 after 1050° C.

The results of table 6 are also demonstrated by the FIGS. 2-4. Pictures with a light microscope at a magnification of 20× have been taken from the assembling layers of examples 1, 2, and 4. The presence of a number of huge voids can be clearly seen in the picture for comparative example 4 in FIG. 4. Examples 1 (FIGS. 2) and 2 (FIG. 3) did not show any voids.

Test Filter due to Example 1 and Comparative Example 4
Test Filter 1
As described in example 1 and 2 a test filter was build up by
  Plugging each second channel complementary on both sides of porous silicon carbide honey comb segments with a porosity of 60%, a mean pore diameter of 20 μm, a cell density of 300 cpsi with a channel opening of 1.1×1.1 mm, using the cement described in example 3. The edge length of the filter segments has been 35 mm at a total length of 178 mm.
  Assembling 16 of these filter segments to a square integral assembly of 4×4 segments using the cement described in example 1 with a thickness of the assembly layer of 2 mm±0.25 mm
  Drying as described in example 1
  Drilling out a round shaped filter with a diameter of 143 mm
  Coating of the lateral surface of the filter to close the open channels using the cement described in example 1 and drying it as described in example 1
  Hardening of the filter at 550° C. and heating up to 600° C. for ½ hour.
Test Filter 2
As described in comparative example 4 a test filter was build up by
  Plugging each second channel complementary on both sides of porous silicon carbide honey comb segments with a porosity of 60%, a mean pore diameter of 20 μm, a cell density of 300 cpsi with a channel opening of 1.1×1.1 mm, using a cement with the following composition:
    SiC F800 64.5 weigh-%, cellulose ether 1 weigh-%, silica sol (45% solid content) 23.5 weight-% and water 11 weight-%.
  The edge length of the filter segments has been 35 mm at a total length of 178 mm.
  Assembling 16 of these filter segments to a square integral assembly of 4×4 segments using the cement described in comparative example 4 with a thickness of the assembly layer of 2 mm±0.25 mm
  Drying as described in comparative example 4
  Drilling out a round shaped filter with a diameter of 143 mm
  Coating of the lateral surface of the filter to close the open channels using the cement described in comparative example 4 and drying it as described in comparative example 4
  Hardening of the filter at 750° C. for 1 hour.
Test:
Test with artificial soot generated by a diesel burner and simulation of a thermo shock regeneration at a loading level of 10 g/l.

Figure 5:
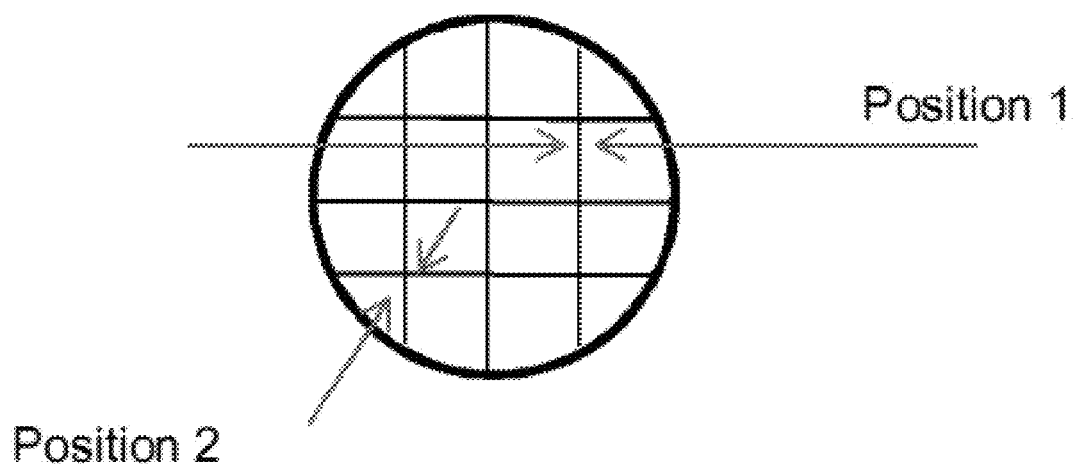
FIG. 5 shows the measuring positions of a thermal gradient.

A DPG from Cambustion was used to load the filters. The temperature inside the filters was measured with thermo couples, positioned inside the channels in the middle and 13 mm from the out let of the filter. The thermal gradient was measured over the cement layer in the middle of two inner segments (position 1) and over the crossing point of assembling layers, connecting an inner segment with 3 outer segments (position 2). The positions are shown in FIG. 5.

The thermo shock test was performed by heating up the gas flow through the filter from 400° C. up to 650° C. within 40 seconds. After another 50 seconds the temperature in the middle of the filter increased to 700° C. which indicates, that the soot has started to burn. At that time, the flow rate was dropped from 190 kg/h to 45 kg/h and the gas burner was shut off. This has led to the overheating effect with peak temperatures of about 1000° C. in the middle of the inner segments.

TABLE 7

Result for maximum temperature and thermal gradients during the thermo shock test.

| Filter | Soot burn rate | max. Temperature | therm. gradient over cement layer, pos. 1 | therm. gradient over cement layer, pos. 2 |
|---|---|---|---|---|
| Filter 1 | 50% | 1001° C. | 72° C./cm | 142° C./cm |
| Filter 2 | 47% | 1015° C. | 220° C./cm | 267° C./cm |

The thermal gradients within the filter segments have been for both filters in the range of 120-180° C./cm. The soot burn rate and the maximum temperature in the filters have been within the repeatability for both filters also the same. The only difference between both filters can be seen in the thermal gradient measured over the cement layers. The values are given in table 7. It is significant higher for filter 2 with the Isofrax cement in comparison to filter 1. This is of course the effect of the higher thermal conductivity.

The inspection of the assembling layers inside the filters has been done by cutting them into slices. In case of filter 1 no damages like cracks or defects like voids could be seen.

In case of filter 2 a huge number of cracks and voids in the assembling layer could be observed. Near to the region which has been the warmest during the thermo shock test the cracks in filter 2 have been severe. The cut slice broke along these cracks in the assembling layer into several parts without applying any force. In contrast to that the slices cut from filter 1 have been still stable. This is a clear indication, that the cement used for filter 2 showed sintering effects at the high temperatures, resulting in additional shrinkage. This shrinkage is a result of the used silica sol. In case of the phosphate containing cement for filter 1 no shrinkage and therefore no cracks and voids inside the assembling layer could be observed. This result corresponds very well with the 1050° C. heat-up test of the assembled honey combs (see table 6). The voids in the assembling layer of filter 2 have the same appearance as shown for the example in FIG. 4.

I claim:

1. A hardened cement composition consisting of a non-oxide inorganic silicon containing component and metaphosphates,
    wherein the non-oxide inorganic silicon containing component comprises an inorganic powder having a bimodal particle size distribution consisting of coarse particles and fine particles, the coarse particles having a mean particle diameter size in the range from 20-150 µm and the fine particles having a mean particle diameter size in the range from 1-20 µm; and
    wherein the metaphosphates bind the coarse particles and the fine particles together to form the hardened cement composition.

2. An article of manufacture comprising:
    a first porous ceramic honey comb filter segment;
    a second porous ceramic honey comb filter segment; and
    a layer of the hardened cement composition of claim 1 between the first and second porous ceramic honey comb filter segments, wherein the cement holds together the first and second porous ceramic honey comb filter segments.

3. The hardened cement composition of claim 1, wherein the cement is hardened at a temperature sufficiently high to transform substantially all phosphate components into the metaphosphates.

4. The hardened cement composition of claim 1, wherein the cement is hardened at the temperature of about 800° C.-1000° C.

5. The article of manufacture of claim 2, wherein the hardened cement composition has a thermal conductivity equal to or greater than a thermal conductivity of the first and second honey comb filter segments.

6. The article of manufacture of claim 2, wherein the hardened cement composition has a specific heat capacity per unit volume equal to or greater than a specific heat capacity per unit volume of the first and second honey comb filter segments.

7. The article of manufacture of claim 2, wherein the hardened cement composition has a coefficient of thermal expansion substantially similar to a coefficient of thermal expansion of the first and second honey comb filter segments.

8. The hardened cement composition of claim 1, wherein the inorganic power is silicon carbide or silicon nitride or mixtures thereof.

9. The hardened cement composition of claim 8, wherein the silicon carbide is alpha-silicon carbide.

10. The hardened cement composition of claim 1, wherein the metaphosphates are aluminum metaphosphates.

* * * * *